US011360919B2

(12) United States Patent
Kim (10) Patent No.: US 11,360,919 B2
(45) Date of Patent: Jun. 14, 2022

(54) DATA PROCESSING SYSTEM WITH ADJUSTABLE SPEED OF PROCESSOR AND OPERATING METHOD THEREOF

(71) Applicant: SK hynix Inc., Icheon (KR)

(72) Inventor: Joo Young Kim, Icheon (KR)

(73) Assignee: SK hynix Inc., Icheon (KR)

( * ) Notice: Subject to any disclaimer, the term of this patent is extended or adjusted under 35 U.S.C. 154(b) by 224 days.

(21) Appl. No.: 16/790,626

(22) Filed: Feb. 13, 2020

(65) Prior Publication Data
US 2021/0042247 A1 Feb. 11, 2021

(30) Foreign Application Priority Data
Aug. 5, 2019 (KR) .................. 10-2019-0094748

(51) Int. Cl.
*G06F 13/16* (2006.01)
*G06F 13/40* (2006.01)
*G06F 13/12* (2006.01)
*G06F 9/54* (2006.01)
*G06F 1/12* (2006.01)
*G06F 1/324* (2019.01)
*G06F 1/08* (2006.01)

(52) U.S. Cl.
CPC .......... *G06F 13/1673* (2013.01); *G06F 1/08* (2013.01); *G06F 1/12* (2013.01); *G06F 1/324* (2013.01); *G06F 9/544* (2013.01); *G06F 13/122* (2013.01); *G06F 13/4059* (2013.01)

(58) Field of Classification Search
CPC .................. G06F 13/1673; G06F 13/4059
See application file for complete search history.

(56) References Cited

U.S. PATENT DOCUMENTS

| 7,519,788 | B2 | 4/2009 | LaBerge | |
|---|---|---|---|---|
| 2004/0193937 | A1* | 9/2004 | Tarui | G06F 1/324 |
| | | | | 713/600 |
| 2011/0154352 | A1* | 6/2011 | Desota | G06F 13/16 |
| | | | | 718/104 |
| 2018/0284864 | A1* | 10/2018 | HomChaudhuri | G06F 1/324 |
| 2019/0056880 | A1* | 2/2019 | Tzafrir | G06F 3/0656 |

FOREIGN PATENT DOCUMENTS

KR 100689006 B1 3/2007

* cited by examiner

*Primary Examiner* — David E Martinez (57) ABSTRACT

A data processing system includes a controller configured to control data input/output for a memory according to a request of a host. The controller may include a buffer memory including a plurality of buffers configured to store data transmitted from the memory, a processor group including a plurality of cores respectively connected to the plurality of buffers, each core configured to read respective data from its respective buffer and perform computation using the read data, and a speed control component configured to adjust an operating speed of the processor group based on an amount of unread data of each buffer corresponding to each of the plurality of cores.

18 Claims, 7 Drawing Sheets

DATA PROCESSING SYSTEM WITH ADJUSTABLE SPEED OF PROCESSOR AND OPERATING METHOD THEREOF

CROSS-REFERENCES TO RELATED APPLICATION

The present application claims priority under 35 U.S.C. § 119(a) to Korean application number 10-2019-0094748, filed on Aug. 5, 2019, in the Korean Intellectual Property Office, which is incorporated herein by reference in its entirety.

BACKGROUND

1. Technical Field

Various embodiments generally relate to a semiconductor integrated apparatus, and more particularly, to a data processing system and an operating method thereof.

2. Related Art

A circuit or an apparatus composed of semiconductors is configured to transmit/receive an electrical signal. For example, a semiconductor circuit or apparatus is configured to compute or store a received signal and transmit the stored or computed signal.

With an increase in demands for a technology for high-speed transmission, analysis, and processing of high capacity signals, such as artificial intelligence, autonomous driving, robots, and virtual reality, methods for minimizing power consumption of a data processing system are being studied.

SUMMARY

In an embodiment, a data processing system includes a controller configured to control data input/output for a memory according to a request of a host, wherein the controller may include a buffer memory including a plurality of buffers configured to store data transmitted from the memory, a processor group including a plurality of cores respectively connected to the plurality of buffers, each core configured to read respective data from its respective buffer and perform computation using the read data, and a speed control component configured to adjust an operating speed of the processor group based on an amount of unread data of each buffer corresponding to each of the plurality of cores.

In an embodiment, an operating method controlling a data processing system including a plurality of buffers respectively connected to a plurality of cores, the method may include: writing data read from a memory into the plurality of buffers, reading data from a buffer of the plurality of buffers and providing the read data to a core of the plurality of cores connected to the buffer; performing by the core a computation using the data read from the buffer, and adjusting operating speeds of one or more of the plurality of cores based on an amount of unread data in one or more of the plurality of buffers.

DETAILED DESCRIPTION

Hereinafter, a data processing system and an operating method thereof will be described in more detail below with reference to the accompanying drawings.

Figure 1:
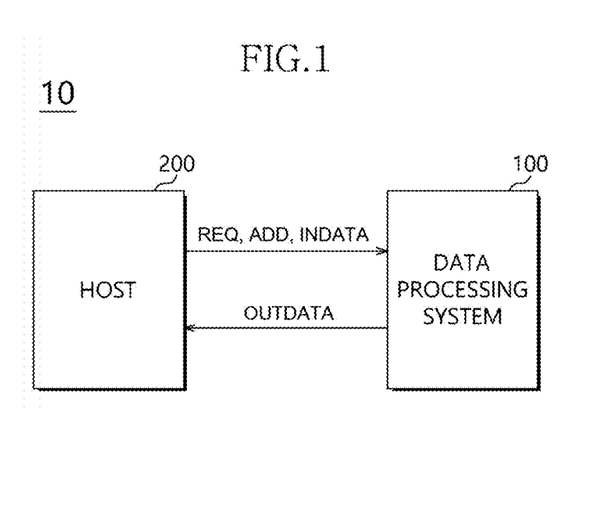
FIG. 1 illustrates an electronic system in accordance with an embodiment.

FIG. 1 is a configuration diagram of an electronic system 10 in accordance with an embodiment.

The electronic system 10 may include a data processing system 100 and a host 200 that communicates with the data processing system 100.

The host 200 may transmit a request REQ, an address ADD, and input data INDATA, if necessary, related to data processing to the data processing system 100. The data processing system 100 may perform an operation corresponding to the request REQ in response to the request REQ, the address ADD, and the input data INDATA of the host 200, and transmit output data OUTDATA produced as a result of the processing to the host 200.

As the amount of the input data INDATA and output data OUTDATA exchanged between the data processing system 100 and the host 200 increases and/or as the host 200 is implemented as a miniaturized device such as a smart phone, a tablet PC, and a notebook, the host 200 may rely on the data processing system 100 to perform computations. That is, the data processing system 100 may be configured not only to store or output data, but also to perform computations using the data by itself.

The data processing system 100 may include a high performance computing (HPC) device that performs advanced computations in a cooperative manner by using a super computer or a computer cluster, or an array of networked information processing devices or servers that process data individually.

The data processing system 100 may include a plurality of data processing devices to store and/or compute data and may output the computed data as the output data OUTDATA.

The data processing device included in the data processing system 100 may include at least one server computer, at least one rack constituting each server computer, or at least one board constituting each rack.

As described above, the data processing system 100 may include a plurality of data processing devices in order to improve information processing performance, and the data processing devices may be electrically networked to mutually transmit, receive and/or share data.

Figure 2:
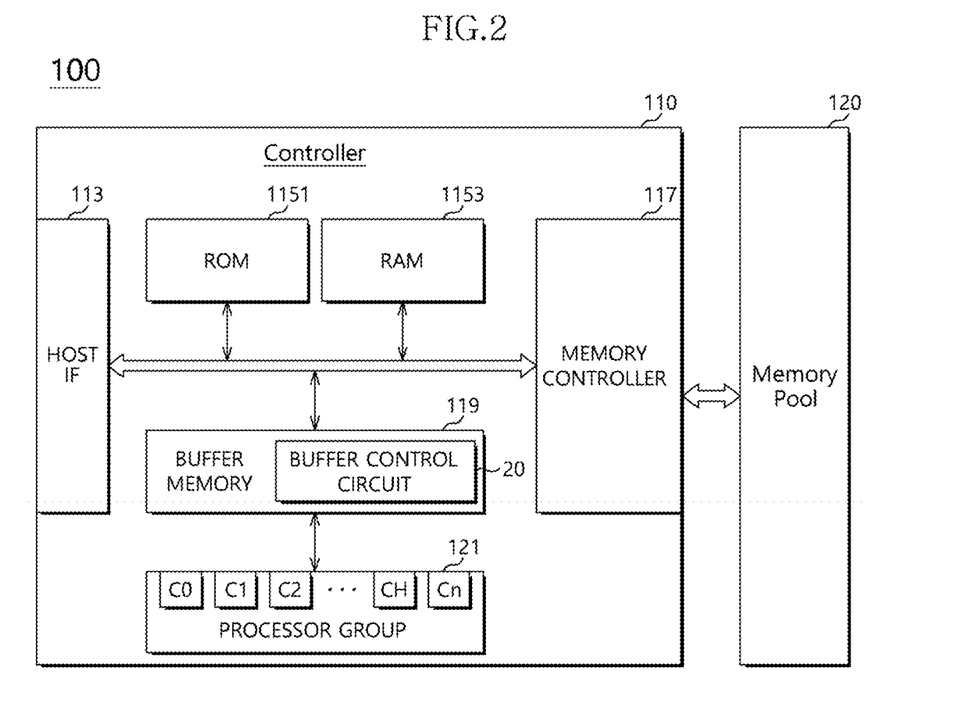
FIG. 2 illustrates a data processing system in accordance with an embodiment.

FIG. 2 is a configuration diagram of a data processing system 100 in accordance with an embodiment.

The data processing system 100 in accordance with an embodiment may include a controller 110 and a memory pool 120.

The controller 110 may be connected to the memory pool 120 to control data input/output for the memory pool 120. The controller 110 may generate a command from the request REQ of the host 200 of FIG. 1 and process data according to the generated command. Processing the data may include reading data stored in the memory pool 120, performing a computation based on the read data, and providing the computed data to the host 200 or the memory pool 120.

The controller 110 may include a host interface (IF) 113, a Read Only Memory (ROM) 1151, a Random Access Memory (RAM) 1153, a memory controller 117, a buffer memory 119, and a processor group 121, and may include a buffer control circuit 20 for controlling the buffer memory 119.

The host IF 113 may provide an interface between the host 200 and the controller 110. The host IF 113 may store and schedule a command derived from the request REQ provided from the host 200 and provide the processed command to the processor group 121. The host IF 113 may provide the memory controller 117 with write data provided from the host 200, or provide the host 200 with read data provided from the memory pool 120 through the memory controller 117 or data outputted from the processor group 121.

The ROM 1151 may store program codes required for the operation of the controller 110, for example, firmware or software, and store code data and the like used by the program codes.

The RAM 1153 may store data required for the operation of the controller 110 or data generated by the controller 110.

The memory controller 117 may transmit the data provided from the host IF 113 to the memory pool 120, or receive the data read from the memory pool 120 and provide the received data to the host IF 113 or the buffer memory 119.

The buffer memory 119 may store the data read from the memory pool 120 under the control of the buffer control circuit 20. The data stored in the buffer memory 119 may be read by the processor group 121.

The processor group 121 may include a plurality of cores C0 to Cn, and may read data from the memory pool 120 and execute at a rate determined by one or more clock signals a program code of an application for which processing is requested according to an application offload processing request of the host 200. Offloading means entrusting a computation of the host 200 to another device, for example, the data processing system 100.

Applications such as big data analytics and machine learning require computations on large amounts of data. In response to these requirements, research on the data processing system 100 capable of being entrusted with and processing computations of the host 200 using a computing engine, that is, the processor group 121, has been conducted. In such an electronic system 10, the host 200 may perform other tasks while the data processing system 100 is performing a large amount of data computations, so that task efficiency can be improved.

In an embodiment, when requesting offload processing of an application, the host 200 may transmit an initial parameter to the data processing system 100 and store the initial parameter in the memory pool 120. In order to distribute and process the application by the cores C0 to Cn of the processor group 121, the memory controller 117 may store the initial parameter, which is stored in the memory pool 120, in the buffer memory 119, and the cores C0 to Cn may read the initial parameter from the buffer memory 119 and execute the program code of the application.

In an embodiment, the data read from the memory pool 120 may be transmitted to the buffer memory 119 in units of pages (which may correspond to row lines in a memory array) and stored into the buffer memory in units of pages. Each of the cores C0 to Cn of the processor group 121 may independently access the buffer memory 119 and read data therefrom.

Figure 3:
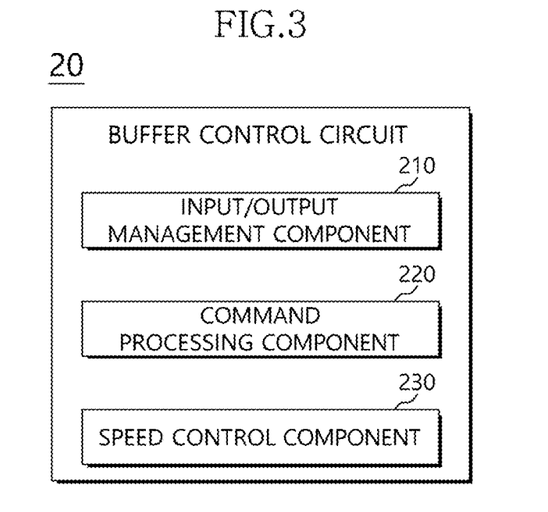
FIG. 3 illustrates a buffer control circuit in accordance with an embodiment.
Figure 4:
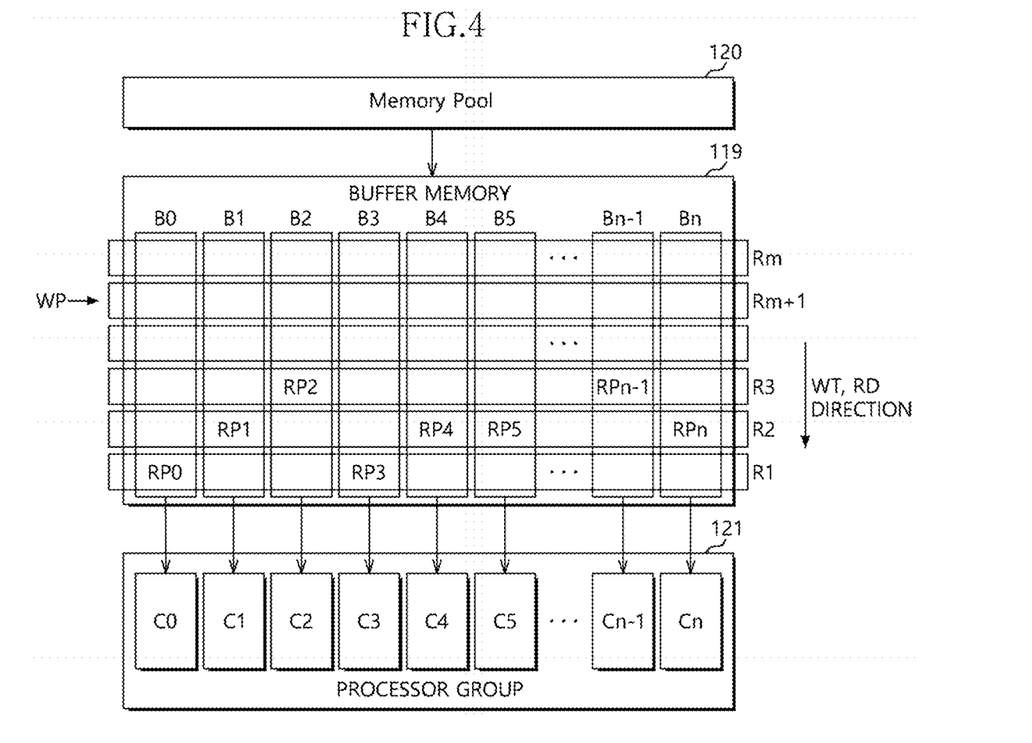
FIG. 4 illustrates operation of a buffer memory in accordance with an embodiment.

FIG. 3 illustrates a buffer control circuit in accordance with an embodiment and FIG. 4 is a conceptual diagram for explaining operation of a buffer memory in accordance with an embodiment.

Referring to FIG. 3, the buffer control circuit 20 may include an input/output management component 210, a command processing component 220, and a speed control component 230.

The input/output management component 210 may manage data input/output for the buffer memory 119 through a write pointer (WP in FIG. 4) and a plurality of read pointers (RP0 to RPn in FIG. 4). For example, when inputting (writing) data to the buffer memory 119, the input/output management component 210 may write the data to an area corresponding to an address indicated by the write pointer WP and increase the write pointer WP. When outputting (reading) the data from the buffer memory 119 to a core Cx, the input/output management component 210 may read the data from an area corresponding to an address indicated by the corresponding read pointer RPx and increase the read pointer RPx.

As illustrated in FIG. 4, the buffer memory 119 may include a plurality of buffers B0 to Bn corresponding to and connected to the cores C0 to Cn, respectively. Each of the buffers B0 to Bn may input/output data in a FIFO manner; however, embodiments are not limited thereto. The depth of each of the buffers B0 to Bn may be the number of pages, and FIG. 4 illustrates the buffers B0 to Bn each having a depth m, that is, m pages.

As data provided from the memory pool 120 is stored in the buffer memory 119 in units of pages, positions where data is to be written to the buffer memory 119 may be managed by a single write pointer WP. Furthermore, as the buffers B0 to Bn are provided to the plurality of cores C0 to Cn and the respective cores C0 to Cn read data independently, positions where data is to be read may be managed by respective read pointers RP0 to RPn for the cores C0 to Cn.

The input/output management component 210 may initialize the buffer memory 119 by setting the write pointer WP and the read pointers RP0 to RPn to address 0.

The command processing component 220 may receive an input or output command of the memory controller 117 or the processor group 121 and perform an operation corresponding to the command.

The speed control component 230 may individually or globally adjust the speeds of the plurality of cores C0 to Cn according to data processing performance of each of the plurality of cores C0 to Cn constituting the processor group 121. In an embodiment, the speed adjustment for the plurality of cores C0 to Cn may be an operation of changing a clock frequency; however, the present technology is not limited thereto.

The data processing performance for each of the cores C0 to Cn may be determined according to the amount of unread data of each of the buffers B0 to Bn for each of the cores C0 to Cn; however, the present technology is not limited thereto. Furthermore, the amount of unread data for each buffer Bx of the buffers B0 to Bn may be checked based on the write pointer WP and the corresponding read pointer RPx, for example, a pointer difference value SUB=WP−RPx corresponding to a difference obtained by subtracting an address indicated by the read pointer RPx from an address indicated by the write pointer WP.

In an embodiment, when a first reference value REF1 is set to "0", the performance level of a core connected to an empty buffer in which the pointer difference value SUB is smaller than the first reference value REF1, that is, the read pointer RPx is earlier than the write pointer WP may be determined as an idle state. In an embodiment, the performance level of a core connected to a buffer in which the pointer difference value SUB is smaller than a second reference value REF2 may be determined as a working-but-not-busy state. The performance level of a core connected to a buffer in which the pointer difference value SUB is equal to or more than the second reference value REF2 may be determined as a busy state.

The speed control component 230 may adjust operating speeds of the cores by adjusting respective clock frequencies of the cores according to the performance levels of the cores.

An example of adjusting the operating speed according to the performance level for each core is illustrated as the following table 1.

TABLE 1

| Pointer difference value SUB = WP − RPx | Core performance level | Clock frequency |
| --- | --- | --- |
| SUB < REF1 (i.e. <0) | Idle state | Frequency down or off |
| SUB < REF2 | Working-but-not-busy state | Frequency down |
| SUB > REF2 | Busy state | Frequency up |

The speed control component 230 may control the operating speed for each core according to the performance level for each core as above; however, the present technology is not limited thereto and the speed control component 230 may collectively control the operating speeds of all the cores. In an embodiment, when any one of all the cores is in the idle state or the number of cores in the working-but-not-busy state among all the cores is equal to or more than a predetermined threshold value, the speed control component 230 may decrease the clock frequency of all the cores.

In the data processing system 100 in which the plurality of cores are included in one computing engine, data processing speeds may be different for each of the plurality of cores C0 to Cn. Since the performance of the computing engine is determined by a core having the lowest operating speed, and since power consumption may vary with data processing speed, it is possible to minimize power consumption by balancing data processing speeds among all the cores C0 to Cn.

Since data is inputted to the buffer memory 119 in units of pages, when a specific core reads all data of a buffer and the buffer is in the empty state, the core may not read data and may therefore be in the idle state when another core has unread data in its buffer that prevents another page of data being stored into the buffer.

In this regard, in an embodiment, an operating speed of a core with little or no remaining task to perform (that is, little or no unread data in its buffer) is decreased and an operating speed of a core with a lot of remaining tasks to perform (that is, a lot of unread data in its buffer) is increased, so that it is possible to balance speeds among all the cores C0 to Cn in the processor group 121.

Figure 5:
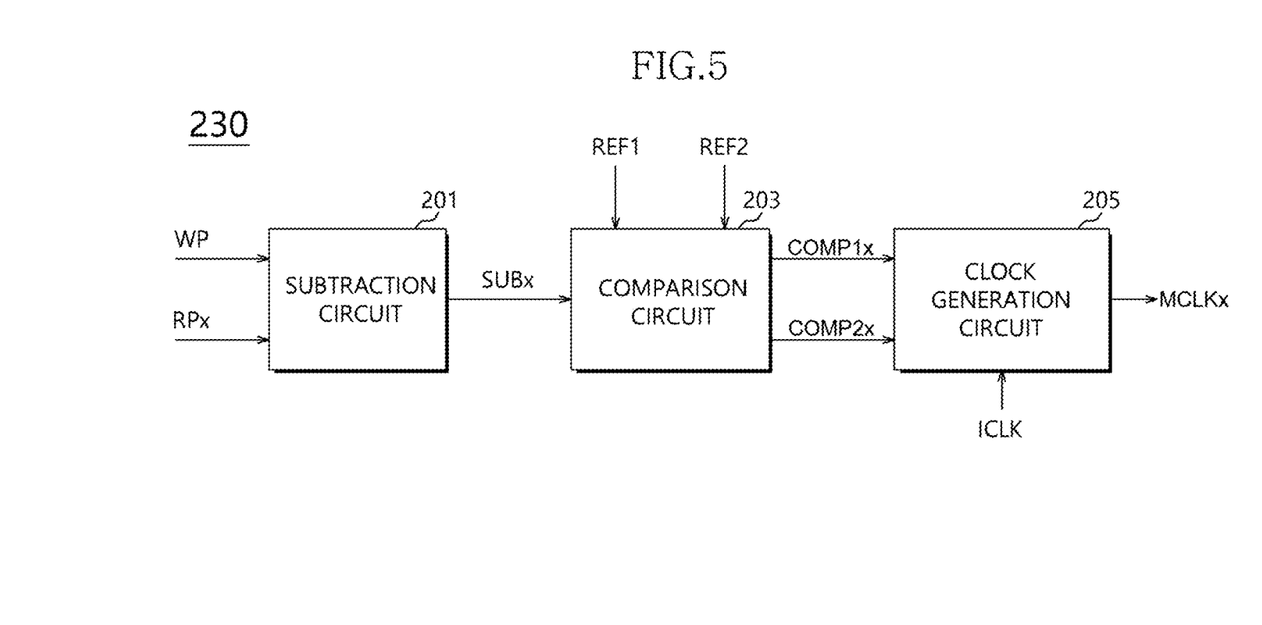
FIG. 5 illustrates a speed control component in accordance with an embodiment.

FIG. 5 is a configuration diagram of the speed control component 230 in accordance with an embodiment.

The speed control component 230 may include a subtraction circuit 201, a comparison circuit 203, and a clock generation circuit 205.

The subtraction circuit 201 may receive the write pointer WP and the respective read pointer RPx for each core and output a respective pointer difference value SUBx for each core by subtracting the read pointer RPx from the write pointer WP.

The comparison circuit 203 may receive the pointer difference value SUBx for each core, the first reference value REF1, and the second reference value REF2, and for each core generate a respective first comparison signal COMP1x and a respective second comparison signal COMP2x.

In an embodiment, the comparison circuit 203 may generate the first comparison signal COMP1x according to a comparison result of the pointer difference value SUBx and the first reference value REF1, and generate the second comparison signal COMP2x according to a comparison result of the pointer difference value SUBx and the second reference value REF2.

The clock generation circuit 205 receives a reference clock signal ICLK, and may output a respective modulated clock signal MCLKx for each core, which is obtained by adjusting a frequency of the reference clock signal ICLK, in response to the respective first and second comparison signals COMP1x and COMP2x for each core.

In an embodiment, the first comparison signal COMP1x may be a signal for determining whether to enable generation of the modulated clock signal MCLKx by the clock generation circuit 205. Accordingly, when the pointer difference value SUBx is smaller than the first reference value REF1, the first comparison signal COMP1x may be outputted at a level capable of disabling generation of a modulated clock signal MCLKx by the clock generation circuit 205.

In an embodiment, the second comparison signal COMP2x may be a signal capable of controlling an oscillation frequency of the modulated clock signal MCLKx by the clock generation circuit 205.

Accordingly, when the clock generation circuit 205 is enabled by the first comparison signal COMP1x, the modulated clock signal MCLKx having an oscillation frequency corresponding to the second comparison signal COMP2x may be outputted. The modulated clock signal MCLKx is respectively provided to a corresponding core Cx and the core Cx may operate at a speed corresponding to the modulated clock signal MCLKx.

Figure 6:
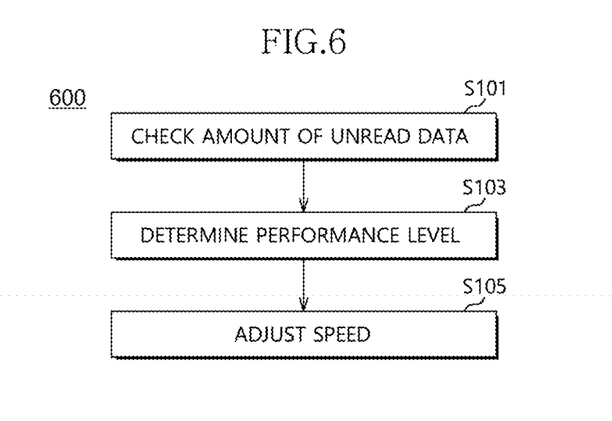
FIG. 6 illustrates an operating process of the data processing system in accordance with an embodiment.

FIG. 6 is a flowchart for explaining an operating process 600 of the data processing system in accordance with an embodiment. The process 600 may be performed by the speed control component 230 of the data processing system 100 in accordance with an embodiment, and may be performed periodically.

The speed control component 230 may check the amount of unread data of the buffers B0 to Bn connected to the cores C0 to Cn, respectively (S101). In an embodiment, the speed control component 230 may receive addresses indicated by the write pointer WP and the read pointer RPx of each of the buffers B0 to Bn from the input/output management component 210 and derive for each core a respective pointer difference value SUBx, thereby checking the amount of unread data (S101) for each core.

The speed control component 230 may determine an individual or overall performance level of the cores C0 to Cn based on the respective pointer difference values SUBx, the first reference value REF1, and the second reference value REF2 (S103).

Then, the speed control component 230 may individually adjust the speeds of the cores C0 to Cn or collectively adjust the speeds of all the cores C0 to Cn according to the performance level determination result (S105). A detailed embodiment of adjusting the speed according to the performance levels of the cores will be described with reference to FIG. 7 and FIG. 8.

Figure 7:
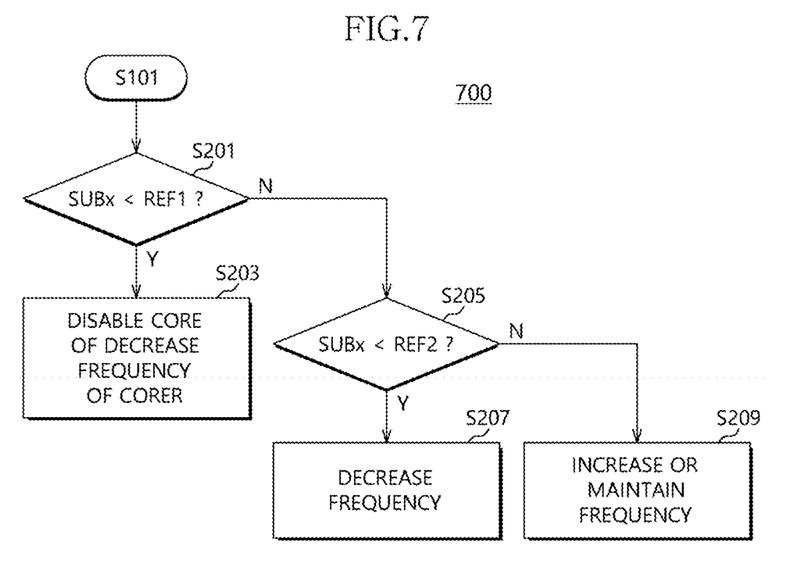
FIG. 7 illustrates an operating process of the data processing system in accordance with an embodiment.

FIG. 7 is a flowchart for explaining an operating process 600 of the data processing system in accordance with an embodiment, and illustrates an embodiment that adjusts the speed of an individual core. The process 700 may be performed periodically by the speed control component 230, and may be performed independently for each core of the plurality of course C0 to Cn in the processor group 121.

The speed control component 230 may compare the pointer difference value SUBx corresponding to the core being controlled with the first reference value REF1 (S201). The first reference value REF1 may be set to "0", for example, and when the pointer difference value SUBx is smaller than the first reference value REF1 (S201: Y), that is, when the read pointer RPx is earlier than the write pointer WP, a corresponding buffer may be determined to be empty.

The speed control component 230 may determine the performance level of a core connected to the empty buffer as the idle state, and therefore disable the core or decrease an operating frequency of the core (S203).

When the pointer difference value SUBx is larger than the first reference value REF1 (S201: N), the speed control component 230 may compare the pointer difference value SUBx with the second reference value REF2 (S205).

When the pointer difference value SUBx is smaller than the second reference value REF2 (S205: Y), the speed control component 230 may determine the performance level of a core connected to a corresponding buffer as the working-but-not-busy state, and decrease an operating frequency of the core (S207).

The speed control component 230 may determine the performance level of a core connected to a buffer in which the pointer difference value SUBx is equal to or more than the second reference value REF2 as the busy state, and substantially maintain or increase an operating frequency of the core (S209).

Figure 8:
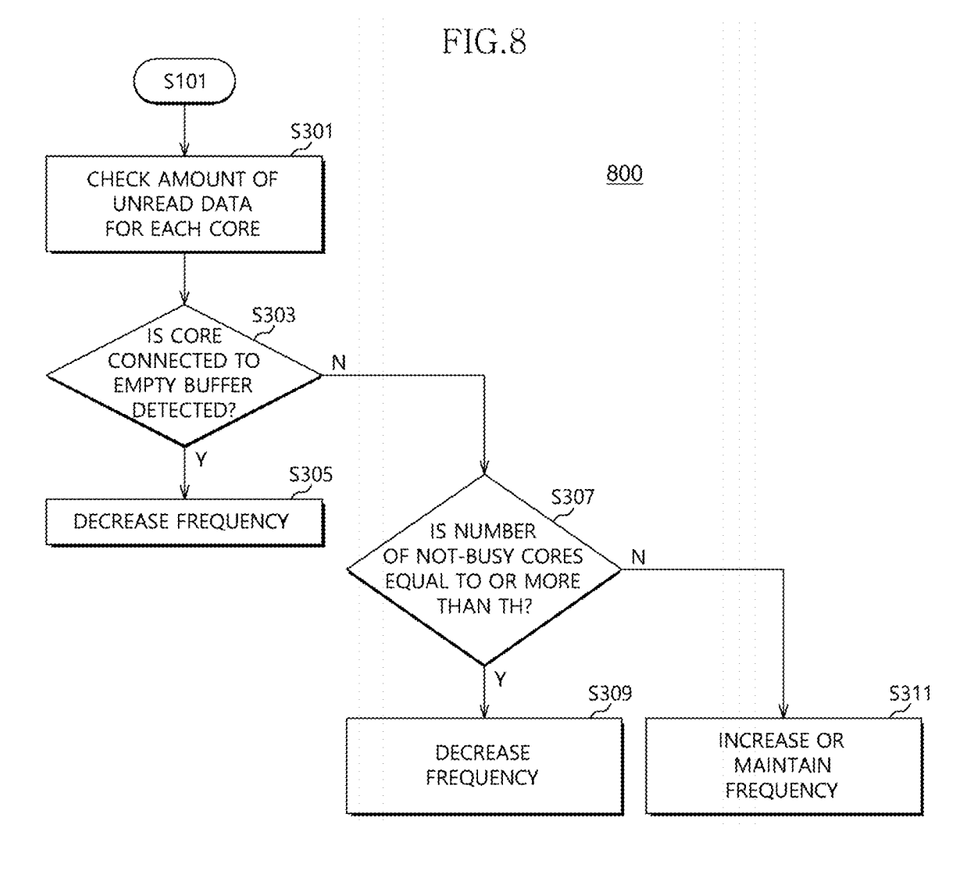
FIG. 8 illustrates an operating process of the data processing system in accordance with an embodiment.

FIG. 8 is a flowchart for explaining an operating process 800 of the data processing system in accordance with an embodiment, and illustrates an embodiment of collectively adjusting the speeds of the cores. The process 800 may be performed by the speed control component 230.

The speed control component 230 may check the amount of unread data for each core included in the processor group 121 (S301).

In an embodiment, in order to check the amount of unread data, the speed control component 230 may compare the pointer difference value SUBx for each of the buffers B0 to Bn with the first reference value (REF1=0) (S303).

When the speed control component 230 detects that at least one core which is connected to a buffer in which the pointer difference value SUBx is smaller than the first reference value REF1 (e.g., the connected buffer is an empty buffer), the speed control component 230 may decrease the operating frequency of all the cores C0 to Cn (S305).

Meanwhile, when no core is detected as being connected to a buffer in the empty state (S303: N), the speed control component 230 may check whether the number of cores detected as being in the working-but-not-busy state among all the cores is equal to or more than a predetermined threshold value TH (S307). In an embodiment, the speed control component 230 may check whether the number of cores which are detected as being connected to buffers in which the pointer difference value SUBx is smaller than the second reference value REF2 is equal to or more than the predetermined threshold value TH.

When the number of cores in the working-but-not-busy state is equal to or more than the predetermined threshold value TH (S307: Y), the speed control component 230 may decrease the clock frequency of all the cores C0 to Cn (S309), and otherwise (S307: N), the speed control component 230 may substantially maintain or increase the clock frequency of all the cores C0 to Cn (S311).

The data processing system 100 of the present technology may be configured by stacking a memory pool on a logic die.

Figure 9:
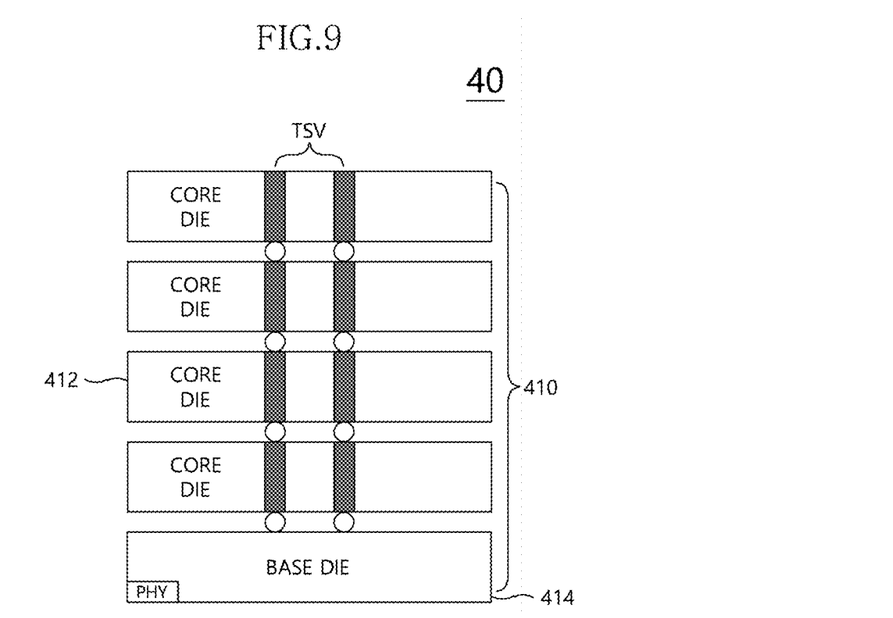
FIGS. 9, 10, and 11 illustrate stacked semiconductor apparatuses in accordance with embodiments.
Figure 10:
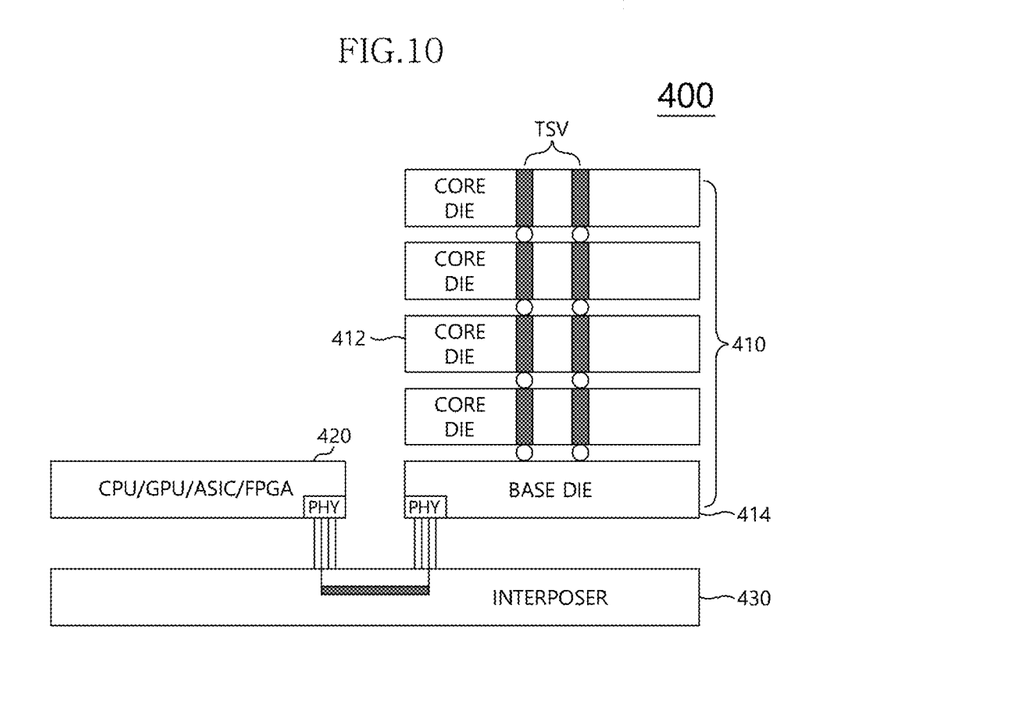
Figure 11:
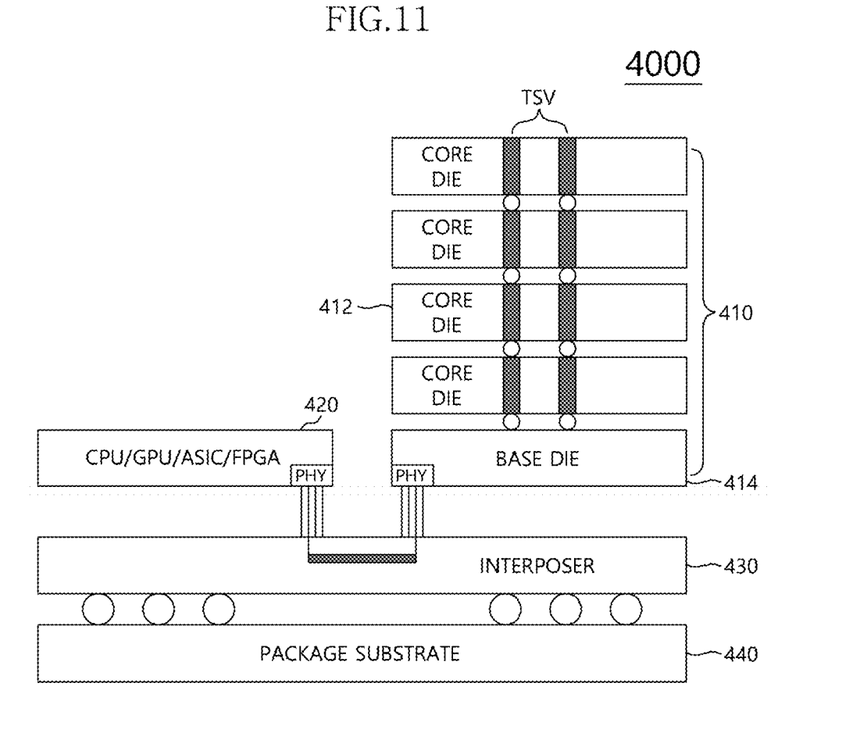

FIGS. 9 to 11 illustrate stacked semiconductor apparatuses in accordance with embodiments.

FIG. 9 illustrates a stacked semiconductor apparatus 40 in accordance with an embodiment.

The stacked semiconductor apparatus 40 may include a stack structure 410 in which a plurality of dies are stacked. The stack structure 410 may be configured in a high bandwidth memory (HBM) type in which the plurality of dies are stacked and electrically connected to one another via through-silicon vias (TSV), so that the number of input/output units is increased and thus a bandwidth is increased.

The stack structure 410 may include a base die 414 and a plurality of core dies 412.

The plurality of core dies 412 may be stacked on the base die 414 and electrically connected to one another via the through-silicon vias (TSV). In each of the core dies 412, memory cells for storing data and circuits for core operations of the memory cells may be disposed.

The core dies 412 may be electrically connected to the base die 414 via the through-silicon vias (TSV) and receive signals, power and the like from the base die 414 via the through-silicon vias (TSV).

The base die 414, for example, may include the controller 110 illustrated in FIG. 2. The base die 414 may perform various functions in the stacked semiconductor apparatus 40, for example, memory management functions such as power management and refresh of the memory cells or timing adjustment functions between the core dies 412 and the base die 414.

A physical interface area PHY included in the base die 414 may be an input/output area of an address, a command, data, a control signal and the like. The physical interface area PHY may be provided with a predetermined number of input/output circuits capable of satisfying a data processing speed required for the stacked semiconductor apparatus 40. A plurality of input/output terminals and a power supply terminal may be provided in the physical interface area PHY on the rear surface of the base die 414 to receive signals and power required for an input/output operation.

FIG. 10 illustrates a stacked semiconductor apparatus 400 in accordance with an embodiment.

The stacked semiconductor apparatus 400 may include a stack structure 410 of a plurality of core dies 412 and a base die 414, a memory host 420, and an interface substrate 430. The memory host 420 may be a CPU, a GPU, an application specific integrated circuit (ASIC), a field programmable gate arrays (FPGA) and the like.

The base die 414 may be provided with a circuit for an interface between the core dies 412 and the memory host 420. The stack structure 410 may have a structure similar to that described with reference to FIG. 9.

A physical interface area PHY of the stack structure 410 and a physical interface area PHY of the memory host 420 may be electrically connected to each other through the interface substrate 430. The interface substrate 430 may be referred to as an interposer.

FIG. 11 illustrates a stacked semiconductor apparatus 4000 in accordance with an embodiment.

It may be understood that the stacked semiconductor apparatus 4000 illustrated in FIG. 11 is obtained by disposing the stacked semiconductor apparatus 400 illustrated in FIG. 10 on a package substrate 440.

The package substrate 440 and the interface substrate 430 may be electrically connected to each other through connection terminals.

A system in package (SiP) type semiconductor apparatus may be implemented by staking the stack structure 410 and the memory host 420, which are illustrated in FIG. 10, on the interface substrate 430 and mounting them on the package substrate 440 for the purpose of package.

Figure 12:
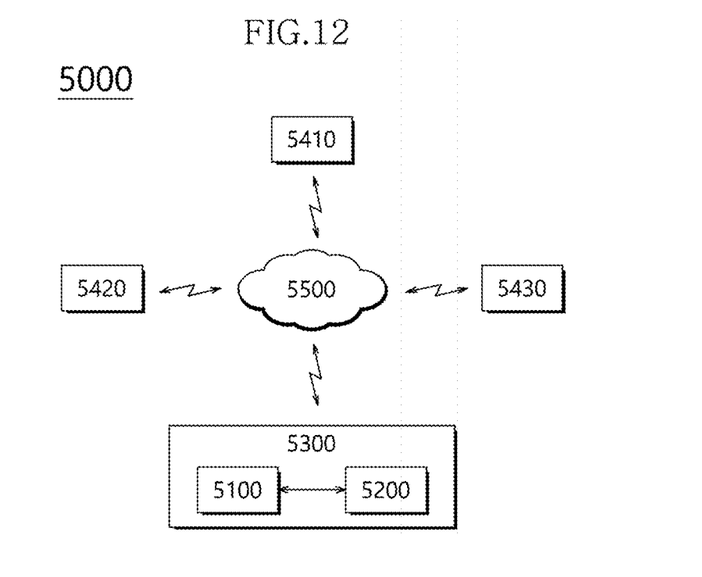
FIG. 12 illustrates a network system including a data storage device in accordance with an embodiment.

FIG. 12 is a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may include one or more of the data processing system 100 shown in FIG. 1, the stacked semiconductor apparatuses 40 shown in FIG. 9, the stacked semiconductor apparatus 400 shown in FIG. 10, or the stacked semiconductor apparatus 4000 shown in FIG. 11, or combinations thereof.

While various embodiments have been described above, it will be understood to those skilled in the art that the embodiments described are examples only. Accordingly, the data processing system and the operating method thereof described herein should not be limited based on the described embodiments.

What is claimed is:

1. A data processing system including a controller configured to control data input/output for a memory according to a request of a host, wherein the controller comprises:
   a buffer memory including a plurality of buffers configured to store data transmitted from the memory;
   a processor group including a plurality of cores respectively connected to the plurality of buffers, each core configured to read respective data from its respective buffer and perform computation using the read data;
   a speed control component configured to adjust an operating speed of the processor group based on an amount of unread data of each buffer corresponding to each of the plurality of cores; and
   an input/output management component configured to manage a write pointer indicating an address in which data is written to the buffer and a plurality of read pointers respectively corresponding to the plurality of buffers, each read pointer indicating an address in which data is read from the corresponding buffer,
   wherein the speed control component is configured to determine the amount of unread data based on a plurality of difference values respectively corresponding to the plurality of buffers, each difference value obtained by subtracting the read pointer for the corresponding buffer from the write pointer.

2. The data processing system according to claim 1, wherein the speed control component is configured to adjust operating speeds of the plurality of cores individually or collectively.

3. The data processing system of claim 1, wherein the speed control component is configured to decrease a clock frequency of all of the plurality of cores when the speed control component detects that at least one of the plurality of difference values is less than a first reference value.

4. The data processing system of claim 1, wherein the speed control component is configured to disable or decrease a clock frequency of a core connected to a buffer when the difference value corresponding to the buffer is less than a first reference value.

5. The data processing system of claim 4, wherein a buffer having a corresponding difference value less than or equal to the first reference value corresponds to the buffer having no unread data.

6. The data processing system of claim 4, wherein the speed control component is configured to decrease the clock frequency of the core connected to the buffer when the difference value corresponding to the buffer is less than a second reference value, the second reference value being greater than the first reference value.

7. The data processing system of claim 6, wherein the speed control component is configured to substantially maintain or increase the clock frequency of the core connected to the buffer when the difference value corresponding to the buffer is equal to or more than the second reference value.

8. The data processing system of claim 6, wherein the speed control component is configured to decrease respective clock frequencies of all of the plurality of cores in response to detecting that a number of buffers having corresponding difference values less than the second reference value is equal to or more than a threshold value.

9. The data processing system of claim 8, wherein the speed control component is configured to substantially maintain or increase the respective clock frequencies of all of the plurality of cores in response to detecting that the number of buffers having corresponding difference values less than the second reference value is less than the threshold value.

10. An method of controlling a data processing system including a plurality of buffers respectively connected to a plurality of cores, the method comprising:
   writing data read from a memory into the plurality of buffers at an address indicated by a write pointer;
   reading data from a buffer from an address indicated by a corresponding read pointer of a plurality of read pointers respectively corresponding to the plurality of buffers and providing the read data to a core of the plurality of cores connected to the buffer;
   performing by the core a computation using the data read from the buffer;
   determining the amount of unread data in the one or more buffers based on one or more respective difference values obtained by subtracting the respective read pointers of the one or more buffers from the write pointer; and adjusting operating speeds of one or more of the plurality of cores based on the amount of unread data in one or more of the plurality of buffers.

11. The method of claim 10, wherein adjusting the operating speeds comprises:
adjusting the operating speeds of the plurality of cores individually or collectively.

12. The operating method according to claim 10, wherein a buffer having a corresponding difference value less than the first reference value corresponds to the buffer having no unread data.

13. The operating method according to claim 10, wherein adjusting the operating speeds comprises:
decreasing a clock frequency of all of the plurality of cores in response to detecting that at least one buffer of the plurality of buffers has a corresponding difference value less than the first reference value.

14. The operating method according to claim 10, wherein adjusting the operating speeds comprises:
disabling or decreasing a clock frequency of a core connected to a buffer when the difference value of the buffer is less than a first reference value.

15. The operating method according to claim 14, wherein adjusting the operating speeds comprises:
decreasing a clock frequency of a core connected to a buffer when a difference value corresponding to the buffer is less than a second reference value, the second reference value being greater than the first reference value.

16. The operating method according to claim 15, wherein adjusting the operating speeds comprises:
substantially maintaining or increasing a clock frequency of the core connected to the buffer when the difference value corresponding to the buffer is equal to or greater than the second reference value.

17. The operating method according to claim 15, wherein adjusting the operating speeds comprises:
decreasing the clock frequency of all of the plurality of cores in response to detecting that the number of buffers having respective difference values smaller than the second reference value is equal to or greater than a threshold value.

18. The operating method according to claim 17, wherein adjusting the operating speeds comprises:
substantially maintaining or increasing the clock frequency of all of the plurality of cores in response to detecting that the number of buffers having the respective difference values smaller than the second reference value is less than the threshold value.

* * * * *